United States Patent Office 3,328,330
Patented June 27, 1967

3,328,330
VINYLIDENE CHLORIDE COPOLYMER LATICES
Alex Trofimow, Brookline, and Merrill Bleyle, Waltham, Mass., assignors to W. R. Grace & Co., Cambridge, Mass., a corporation of Connecticut
No Drawing. Filed Mar. 9, 1964, Ser. No. 350,526
3 Claims. (Cl. 260—29.6)

This invention relates to vinylidene chloride copolymer latices and to processes for preparing said latices.

Polymerized vinylidene chloride latices are characterized generally by high solids content and low viscosity. Such latices form films having a high resistance to moisture vapor transmission and as well as good flexibility without the use of external plasticizers. The barrier and flexibility properties make vinylidene chloride copolymers particularly useful in providing barrier films and coatings for packaging materials such as paperboard, glassine, and polyolefin films, particularly packaging materials for use in the food industry.

Since such coatings or layers are frequently prepared by two or more applications, it is desirable that the polymer film possess the property of rewettability to insure good uniform wetting as well as leveling and bonding of the layers. While the various layers may be applied from two or more latices tailored for the specific purpose, it is desirable and preferable to use a single latex for all the coating layers. It is an object of this invention to provide vinylidene chloride copolymer latices having a particle size and surface tension particularly suitable to recoatability of films and a process for preparing said latices.

It is also an object of this invention to provide a process for preparing vinylidene chloride copolymer latices which may be coated and recoated at relatively low solids content without separation of the polymer particles from the latex.

Still another object of this invention is to provide novel films which possess physical properties, particularly barrier properties, superior to films cast from latices prepared by prior art methods.

Other objects of the invention will in part be obvious and will in part appear hereinafter.

In brief, the present invention comprises preparing a vinylidene chloride copolymer latex by emulsion polymerization wherein the initial concentration of nucleating micelles in the water phase and the subsequent ratio of monomer and emulsifier addition are carefully controlled and the reaction is carried out to a total solids of 40 to 50 percent, preferably 40 to 45 percent.

One method of preparing vinylidene chloride copolymer latices is by the emulsion polymerization of the constituent monomers in the presence of a water-soluble, free radical producing initiator, and an emulsifying agent. Such a process is disclosed and claimed in the copending application of Dudley G. Woodard et al., Ser. No. 132,-119, filed Aug. 17, 1961, now abandoned and refiled as Ser. No. 549,743, filed Apr. 19, 1966. In the aforementioned process, a mono-dispersed latex system is prepared having an average particle size in the range of 1800 to 2400 A. and a total solids of 60 to 65 percent by weight. Briefly, the process comprises an emulsion polymerization process wherein the initial concentration of the nucleating micelles in the water phase is controlled as well as the subsequent rate of monomer and emulsifying agent addition and while maintaining the conversion of monomers in the reaction zone above 80 weight percent at any time after the initiation of the reaction. The reaction proceeds until a polymer dispersion of 60 to 65, and higher, weight percent of total solids is achieved.

While the latices prepared according to the process of application Ser. No. 132,119, provided satisfactory films at relatively high total solids, e.g., 60 percent or above, if such latices were diluted prior to coating, separation of the polymer particles and sedimentation occurred. Such sedimentation was observed when dilution reached about the 55 percent total solids level. By means of the present invention relatively low solids, mechanically stable latices are prepared which provide films having superior properties in comparison to films cast from latices prepared by prior art methods.

The novel process of the present invention comprises the preparation of a polymeric latex, wherein the polymer comprises at least 80 weight percent of vinylidene chloride monomer, and wherein the constituent monomers are emulsified in water in a reaction zone in the presence of an emulsifying agent and polymerized through the agency of a water-soluble polymerization initiator. After an initial charge of monomers and emulsifier, the monomers and emulsifying agent are added continuously to the reaction zone during the course of the reaction while maintaining the weight ratio of the added monomer to the emulsifying agent substantially constant. The rate of addition of monomers should not be such as to cause flooding of the reaction zone, which may cause coagulation, etc. Preferably, the conversion of the monomers in the reaction zone is maintained above 80 weight percent at any time after initiation of the reaction. The improvement of the present invention comprises providing an initial charge of monomers having the specific emulsifier content required for the desired micelle formation, adding the remaining monomers continuously to maintain a predetermined pressure in the reactor, and carrying out the above-described polymerization to a 40 to 50 percent total solids level. The above-mentioned predetermined pressure provides for the addition of monomers at a rate sufficient to keep the monomer conversion above 80 weight percent.

It has been found unexpectedly, therefore, that by carrying out the polymerization to a 40 to 50 percent total solids, unusual and advantageous properties are achieved in the latices and films.

The polymeric latices prepared by the process of the present invention are characterized by having an average particle size of 900 to 1400 A., a surface tension of 30 to 45 dynes/centimeter$^2$, preferably 37 to 38, and a viscosity at 60 percent total solids of 20 to 80 cps. (Brookfield No. 1 spindle, 25° C., 60 r.p.m.). The moisture vapor transmission rate of the latices prepared according to the process of the present invention is one-third to one-half of those measured on latices of the same formulation prepared by prior art methods.

The latices prepared according to the process of the present invention may be utilized as barrier coatings over a wide range of total solids, e.g., as low as about 20 percent or as high as 60 percent or higher. Latices having relatively high total solids are prepared by concentrating, e.g., by vacuum distillation, a latex having a lower total solids. Latices having a total solids of 40 to 50 percent exhibit good recoatability properties, less foaming tendency, and provide films having good moisture vapor transmission rate (MVTR) values.

The polymeric latices prepared by the novel process of the present invention comprise at least 80 or more weight percent of vinylidene chloride monomer with at least a second comonomer. As examples of suitable comonomers, mention may be made of alkyl acrylates such as methyl, ethyl, and butyl acrylates and methacrylates, acrylonitrile, and methacrylonitrile. Other monomers known to the art to be copolymerizable with vinylidene chloride may also be used in the novel process of the present invention.

The novel process of the present invention will now be described in greater detail.

The reactor is charged with demineralized water, heated to reaction temperature, and then purged under vacuum to drive off the entrained air. The constituent monomers and emulsifier are mixed and maintained at a temperature below 40° F. to prevent premature polymerization. An emulsifier coupling agent is preferably then added to prevent the emulsifier from separating. The catalyst is then added to the reactor. The initial charge or preshot of monomer phase is then added to the reactor. The preshot contains the monomer-emulsifier ratio which will provide the desired small particle size. The addition of aqueous solution of initiator is then begun and continued throughout the reaction. The free monomers in the reactor cause the pressure to rise, but as the polymerization proceeds and the free monomers are consumed by the reaction, the pressure drops. When the pressure drops to a predetermined level, additional monomer phase is added at a rate sufficient to maintain said predetermined pressure. At the end of the reaction period, i.e., when the latex has reached the 40 to 50 percent total solids, the reactor may be vacuum purged, if desired, to remove unreacted monomers. A determination of the residual monomers in the reactor has shown that the ratio of unreacted monomers is the same as the charge ratio. The latex may then be given one or more of several optional treatments, e.g., stripping, pH adjustment, or concentration to a higher solids level. The reaction in the process of the present invention proceeds to at least 98+ percent completion.

As described above, the emulsifier is preferably added to the reactor with the monomer phase. It should be understood that the emulsifier may also be added separately, if desired. However, by adding the emulsifier with the monomer phase, the ratio of emulsifying agent to monomer will remain constant. The mixture of monomers and emulsifying agent can be made merely by agitating the materials together and maintaining agitation or by adding an emulsifier coupling agent to prevent separation. Suitable coupling agents are acetic acid, glycerine, water, acrylic acid, methanol and wetting agents such as dioctyl sulfosuccinate (Aerosol OT). The coupling agents will normally be used in amounts of 0.1 to 4 weight percent based on the weight of the monomers.

The emulsifier ratio in the present invention ranges from about 3.0 to 4.25 percent of the total monomers. Preferably, 3.75 percent emulsifier is used. If less than about 3.0 percent is used, the storage stability of the latices decreases significantly. If more than 4.25 percent emulsifier is used, the moisture vapor transmission rate (MVTR) of the films is adversely affected, and foaming and other problems of mechanical stability arise in connection with the latex.

In order to provide the desired particle size, the initial charge in the reactor contains from 0.25 to 0.29 percent of emulsifier based on the aqueous phase. The greater the amount of emulsifier, the smaller the particle size.

The reaction temperature is determined by the molecular weight desired in the polymer and the catalyst used. Generally, the reaction temperature may vary from 105 to 135° F.; preferably the reaction is run at 120 to 124° F. For the lower temperature ranges persulfate catalysts are used while peroxide catalysts are utilized in the higher temperature ranges.

The pressure used is usually high enough to get a good reaction rate but low enough to avoid flooding the reaction zone with monomers. The pressure is generally within the range of 1 to 30 p.s.i.

The following nonlimiting example illustrates the novel process of the present invention.

EXAMPLE 1

|  | Weight Percent | Pounds |
|---|---|---|
| Monomer Phase: |  |  |
|   Vinylidene chloride | 90.0 | 9,360 |
|   Butyl acrylate | 7.0 | 728 |
|   Acrylonitrile | 3.0 | 312 |
|   Acrylic Acid | 0.25 | 26 |
|   Sodium dodecylbenzene sulfonate | 3.75 | 390 |
| Aqueous Phase: Demineralized water | 140 | 14,560 |
| Catalyst: Hydrogen Peroxide | 0.5 | 5.20 |
| Initiator Phase: |  |  |
|   Ferric chloride | 0.002 | 0.208 |
|   Demineralized water | 2.0 | 204 |

The aqueous phase was placed in the reactor, heated to 122° F. and then purged under 15 in. of vacuum for one hour. The monomers, emulsifier, and coupling agent were mixed and maintained at 38 to 40° F. The hydrogen peroxide was added to the aqueous phase, and the initial monomer charge was placed in the reactor (9 percent of the monomer phase). The addition of the initiator phase was then begun. The pressure in the reactor at this point was 13 p.s.i. which started to drop when polymerization was initiated. When the pressure fell to 8 p.s.i., additional monomer phase was added at a rate sufficient to maintain the pressure at 8 p.s.i. The temperature of the reactor was maintained at 122° F. during the 8 to 10 hour period of monomer addition. After all the monomer phase had been added, the system was allowed to remain for 3½ hours at 122° F.

The finished latex exhibited the following properties:

Total solids _____percent__ 41
Surface tension _____dynes/centimeter $^2$__ 38
Viscosity at 60% total solids _____cps__ 50
  (Brookfield No. 1 spindle, 25° C., 60 r.p.m.)
Particle size _____A__ 900

The following table illustrates representative vinylidene chloride copolymer compositions prepared by the novel process of the present invention and the properties of the latices so produced:

| | Example | | | | | | | | |
|---|---|---|---|---|---|---|---|---|---|
| | 2 | 3 | 4 | 5 | 6 | 7 | 8 | 9 | 10 |
| Vinylidene chloride | 87 | 91 | 91 | 91 | 90 | 91 | 91 | 87 | 92 |
| Methyl acrylate | | 4.5 | 5 | 7 | 7 | 8 | 6 | 5 | 8 |
| Methyl methacrylate | 10 | 1.5 | 2 | | | | | 5 | |
| Acrylonitrile | 3 | 3 | 2 | 2 | 3 | 1 | 3 | 3 | |
| Surface tension, dynes/cm.$^2$ | 35.5 | 36.2 | 37.4 | 37.5 | 34.5 | 35.5 | 38.3 | 32.5 | 38.5 |
| Viscosity, cps. (Brookfield No. 1 spindle at 60% Total Solids at 25° C.) | 29 | 35 | 29 | 40 | 25 | 23 | 25 | 35 | 39.5 |
| Particle size (A.) | 929 | 930 | 918 | 900–1,100 | 1,158 | 1,233 | 1,313 | 907 | 1,098 |
| MVTR | 0.26 | 0.17 | 0.20 | 0.20 | 0.22 | 0.26 | 0.25 | 0.35 | 0.16 |

The moisture vapor transmission rate of the films prepared from the latices was determined in the following manner. The latex at 60 percent total solids was coated by a single pass on a Moss Cote (clay-coated board) using a No. 16 Mayer rod and a coating weight of 14 to 16 pounds per ream (3000 square feet). The coated samples were immediately dried in a circulated air oven at 120° C. for 20 seconds. Sufficient desiccant to cover the bottom evenly was placed in a clean test dish of the type illustrated in TAPPI STANDARDS, T464 m—45. The test specimen was cut with a die to a size to fit snugly into the flange on the test dish. The specimen was placed in position in the test cup with the coated side up, and steel template was centered on the specimen. Molten wax was allowed to flow into the annular space between the template and the flange thereby providing a moisture tight seal between the edge of the specimen and the test dish. The wax was allowed to harden, and the template was removed. The test dishes with the specimens were placed into a 100° F. forced air oven at 90 percent relative humidity. The test dishes were removed from the oven and weighted after every 24 hours of successive exposure until the moisture gain of the test dishes reached a constant weight. All samples were run in triplicate with a known sample as a control for each group of tests. The MVTR is reported as moisture pick-up in grams of water per 24 hours per hundred square inches at 100° F. and 90 percent relative humidity.

Any emulsifier capable of operating in an acid medium may be used in the novel process of the present invention. For example, the soluble salts of an aryl sulfate or of a long chain alkyl-aryl sulfonate such as sodium dodecyl benzene sulfonate and sodium lauryl sulfate are satisfactory.

Any of the conventional peroxides, persulfates, or azo compounds can be utilized as catalysts. Among the suitable catalysts may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox catalyst such as a combination of any of the peroxygen catalysts mentioned above together with reducing agents such as sodium sulfite, sucrose, ferrous gluconate, etc. The amount of the catalyst may be varied over a relatively wide range; generally about 0.1 percent to about 0.5 percent by weight of the materials to be polymerized is used.

Film formation of the latex prepared by the novel process of the instant invention will take place by depositing a coating of the latex on any suitable substrate and drying it in air for about two minutes at room temperature. Free films may be obtained by depositing the latex on a nonporous surface of a substrate and stripping the dried film from the substrate. If a shorter drying cycle is required, temperatures as high as about 105° C. to 120° C. may be used. It has been found, however, that if excessive drying temperatures are employed, film discoloration may occur and in some cases, blistering of the film has been observed.

Various methods or means of depositing a coating of the latex on any suitable substrate may be used. Any type of mechanism or device which is capable of depositing a uniform amount in the desired thickness to the substrate may be employed. Special types which may be used include air knife coater, horizontal and vertical size presses, trailing blade, transfer roll, reverse roll, roller coater, gravure, bead coat, metering bar, spray coater, and curtain coater. Deposition may be carried out in one or a number of applications.

Some coating methods may require an increase in the viscosity of the latex. In such case, the viscosity change may be brought about without interfering with film-forming properties by the addition of suitable thickening agents, such as sodium alginate, karaya gum, hydroxyethyl cellulose, and polyvinyl alcohol. Ordinarily, satisfactory results are obtained with less than 1 percent of the thickening agent based on the weight of the dispersed solids.

What is claimed is:
1. An aqueous dispersion of a vinylidene chloride copolymer of at least 80 weight percent of vinylidene chloride monomer having an average particle size of about 900 to 1400 A., a surface tension of 30 to 45 dynes/centimeter$^2$ and a viscosity of 20 to 80 cps. at 60 percent total solids (Brookfield No. 1 spindle, 25° C.).
2. The product as defined in claim 1 wherein said copolymer is composed of vinylidene chloride, acrylonitrile and methyl acrylate in the weight ratio of 91:2:7, respectively.
3. The product as defined in claim 1 wherein said copolymer is composed of vinylidene chloride, acrylonitrile, methyl acrylate, and methyl methacrylate in the weight ratio of 91:2:5:2, respectively.

References Cited

UNITED STATES PATENTS

| | | | |
|---|---|---|---|
| 3,097,178 | 7/1963 | Townsend et al. | 260—29.6 |
| 3,104,231 | 9/1963 | Fitch | 260—29.6 |

SAMUEL H. BLECH, *Primary Examiner.*

MURRAY TILLMAN, GEORGE F. LESMES, *Examiners.*

J. ZIEGLER, *Assistant Examiner.*